(12) United States Patent
Stopczynski

(10) Patent No.: US 6,519,519 B1
(45) Date of Patent: Feb. 11, 2003

(54) PASSIVE COUNTERMEASURE METHODS

(75) Inventor: Lawrence Gerard Stopczynski, Milford, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/683,674

(22) Filed: Feb. 1, 2002

(51) Int. Cl.[7] .............................................. G06F 17/00
(52) U.S. Cl. .................... 701/45; 280/734; 280/735; 701/1
(58) Field of Search ............... 701/45, 1; 280/734, 280/735, 802, 748

(56) References Cited

U.S. PATENT DOCUMENTS

| | | |
|---|---|---|
| 3,514,610 A | 5/1970 | Huston et al. |
| 4,257,703 A | 3/1981 | Goodrich |
| 4,381,829 A | 5/1983 | Montaron |
| 4,623,966 A | 11/1986 | O'Sullivan |
| 4,638,289 A | 1/1987 | Zottnik |
| 4,673,937 A | 6/1987 | Davis |
| 4,833,469 A | 5/1989 | David |
| 4,916,450 A | 4/1990 | Davis |
| 4,969,103 A | 11/1990 | Maekawa |
| 4,992,943 A | 2/1991 | McCracken |
| 4,994,972 A | 2/1991 | Diller |
| 5,040,118 A | 8/1991 | Diller |
| 5,063,603 A | 11/1991 | Burt |
| 5,091,726 A | 2/1992 | Shyu |
| 5,162,794 A | 11/1992 | Seith |
| 5,166,881 A | 11/1992 | Akasu |
| 5,173,859 A | 12/1992 | Deering |
| 5,182,459 A | 1/1993 | Okano et al. |
| 5,230,400 A | 7/1993 | Kakinami et al. |
| 5,234,071 A | 8/1993 | Kajiwara |
| 5,249,157 A | 9/1993 | Taylor |
| 5,307,136 A | 4/1994 | Saniyoshi |
| 5,314,037 A | 5/1994 | Shaw et al. |
| 5,430,432 A | 7/1995 | Camhi et al. |
| 5,467,283 A | 11/1995 | Butsuen et al. |
| 5,479,173 A | 12/1995 | Yoshioka et al. |
| 5,502,432 A | 3/1996 | Ohmamyuda et al. |
| 5,521,580 A | 5/1996 | Kaneko et al. |
| 5,526,269 A | 6/1996 | Ishibashi et al. |
| 5,534,870 A | 7/1996 | Avignon et al. |
| 5,541,590 A | 7/1996 | Nishio |
| 5,552,986 A | 9/1996 | Omura et al. |
| 5,572,428 A | 11/1996 | Ishida et al. |
| 5,574,463 A | 11/1996 | Shirai et al. |
| 5,594,414 A | 1/1997 | Namngani |
| 5,602,760 A | 2/1997 | Chacon et al. |
| 5,604,683 A | 2/1997 | Roecker |
| 5,629,847 A | 5/1997 | Shirakawa et al. |
| 5,635,922 A | 6/1997 | Cho et al. |
| 5,646,612 A | 7/1997 | Byon |
| 5,680,097 A | 10/1997 | Uemura et al. |

(List continued on next page.)

FOREIGN PATENT DOCUMENTS

| | | |
|---|---|---|
| EP | 0720928 A2 | 10/1996 |
| JP | 54-65934 A | 5/1979 |
| WO | WO 98/37435 | 8/1998 |
| WO | WO 98/58274 | 12/1998 |

*Primary Examiner*—William A. Cuchlinski, Jr.
*Assistant Examiner*—Olga Hernandez
(74) *Attorney, Agent, or Firm*—Gregory P. Brown

(57) ABSTRACT

A method of performing passive countermeasures for an automotive vehicle (12) having a vehicle sensor complex (18) generating a vehicle sensor complex signal is provided. The method of performing passive countermeasures includes performing an accelerometer initiated passive countermeasure method and performing a sensor fusion initiated passive countermeasure method. An object is detected with a sensor fusion (14) and an object parameter signal is generated. The object parameter signal is compared with an object parameter threshold level. The sensor fusion initiated passive countermeasure method is terminated when the object parameter signal is greater than the object parameter threshold level.

22 Claims, 5 Drawing Sheets

U.S. PATENT DOCUMENTS

| | | | |
|---|---|---|---|
| 5,684,474 A | 11/1997 | Gilon et al. | |
| 5,689,264 A | 11/1997 | Ishikawa et al. | |
| 5,699,040 A | 12/1997 | Matsuda | |
| 5,699,057 A | 12/1997 | Ikeda et al. | |
| 5,710,565 A | 1/1998 | Shirai et al. | |
| 5,745,870 A | 4/1998 | Yamamoto et al. | |
| 5,748,477 A | 5/1998 | Katoh | |
| 5,749,426 A | 5/1998 | Gilling | |
| 5,751,211 A | 5/1998 | Shirai et al. | |
| 5,751,836 A | 5/1998 | Wildes et al. | |
| 5,754,099 A | 5/1998 | Nishimura et al. | |
| 5,771,481 A | 6/1998 | Gilling | |
| 5,779,264 A | 7/1998 | Demesseman et al. | |
| 5,808,561 A | 9/1998 | Kinoshita et al. | |
| 5,815,093 A | 9/1998 | Kikinis | |
| 5,835,007 A | 11/1998 | Kosiak | |
| 5,835,873 A | 11/1998 | Darby et al. | |
| 5,838,228 A | 11/1998 | Clark | |
| 5,847,472 A | 12/1998 | Byon | |
| 5,847,755 A | 12/1998 | Wixson et al. | |
| 5,872,536 A | 2/1999 | Lyons et al. | |
| 5,905,457 A | 5/1999 | Rashid | |
| 5,906,393 A | 5/1999 | Mazur et al. | |
| 5,920,345 A | 7/1999 | Sauer | |
| 5,926,126 A | 7/1999 | Engelman | |
| 5,936,549 A | 8/1999 | Tsuchiya | |
| 5,938,714 A | 8/1999 | Satonaka | |
| 5,948,026 A | 9/1999 | Beemer, II et al. | |
| 5,949,366 A | 9/1999 | Herrman | |
| 5,949,918 A | 9/1999 | McCaffrey | |
| 5,955,967 A | 9/1999 | Yamada | |
| 5,959,552 A | 9/1999 | Cho | |
| 5,963,272 A | 10/1999 | Wixson | |
| 5,964,822 A | 10/1999 | Alland et al. | |
| 5,983,161 A | 11/1999 | Lemelson et al. | |
| 5,995,037 A | 11/1999 | Matsuda et al. | |
| 5,999,117 A | 12/1999 | Engel | |
| 5,999,874 A | 12/1999 | Winner et al. | |
| 6,002,983 A | 12/1999 | Alland et al. | |
| 6,018,308 A | 1/2000 | Shirai | |
| 6,025,797 A | 2/2000 | Kawai et al. | |
| 6,026,340 A | 2/2000 | Corrado et al. | |
| 6,031,484 A | 2/2000 | Bullinger et al. | |
| 6,037,860 A | 3/2000 | Zander et al. | |
| 6,044,166 A | 3/2000 | Bassman et al. | |
| 6,044,321 A | 3/2000 | Nakamura et al. | |
| 6,049,619 A | 4/2000 | Anandan et al. | |
| 6,061,105 A | 5/2000 | Sugimoto | |
| 6,076,028 A | 6/2000 | Donnelly et al. | |
| 6,084,508 A | 7/2000 | Mai et al. | |
| 6,085,151 A | 7/2000 | Farmer et al. | |
| 6,087,928 A | 7/2000 | Kleinberg et al. | |
| 6,088,639 A | 7/2000 | Fayyad et al. | |
| 6,094,159 A | 7/2000 | Oterfeld et al. | |
| 6,097,332 A | 8/2000 | Crosby, II | |
| 6,114,951 A | 9/2000 | Knioshita et al. | |
| 6,121,896 A | 9/2000 | Rahman | |
| 6,138,073 A * | 10/2000 | Uchigaki | 701/208 |
| 6,148,943 A | 11/2000 | Kodaka et al. | |
| 6,151,539 A | 11/2000 | Bergholz et al. | |
| 6,157,892 A | 12/2000 | Hada et al. | |
| 6,161,074 A | 12/2000 | Sielagoski et al. | |
| 6,168,198 B1 | 1/2001 | Breed et al. | |
| 6,169,479 B1 | 1/2001 | Boran et al. | |
| 6,177,866 B1 | 1/2001 | O'Connell | |
| 6,185,490 B1 | 2/2001 | Ferguson | |
| 6,186,539 B1 | 2/2001 | Foo et al. | |
| 6,188,316 B1 | 2/2001 | Matsuno et al. | |
| 6,191,704 B1 | 2/2001 | Takenaga et al. | |
| 6,204,756 B1 | 3/2001 | Senyk et al. | |
| 6,208,249 B1 * | 3/2001 | Saito et al. | 340/561 |
| 6,209,909 B1 | 4/2001 | Breed | |
| 6,218,960 B1 | 4/2001 | Ishikawa et al. | |
| 6,223,125 B1 | 4/2001 | Hall | |
| 6,225,918 B1 | 5/2001 | Kam | |
| 6,226,389 B1 | 5/2001 | Lemelson et al. | |
| 6,229,438 B1 | 5/2001 | Kutlucinar et al. | |
| 6,219,606 B1 | 6/2001 | Wessels et al. | |
| 6,246,961 B1 | 6/2001 | Sasaki et al. | |
| 6,249,738 B1 | 6/2001 | Higashimata et al. | |
| 6,256,584 B1 | 7/2001 | Kodaka et al. | |
| 6,259,992 B1 | 7/2001 | Urai et al. | |
| 6,278,945 B1 * | 8/2001 | Lin | 701/216 |
| 6,311,129 B1 * | 10/2001 | Lin | 342/422 |
| 6,325,413 B2 * | 12/2001 | Saito et al. | 280/735 |
| 6,356,187 B2 * | 3/2002 | Jinno et al. | 180/271 |
| 6,370,461 B1 * | 4/2002 | Pierce et al. | 280/734 |

* cited by examiner

PASSIVE COUNTERMEASURE METHODS

BACKGROUND OF INVENTION

The present invention is related to U.S. patent application Ser. No. 09/683,676 entitled "Collision Warning and Safety Countermeasure System" filed simultaneously herewith and incorporated by reference herein.

The present invention relates generally to collision warning systems, and more particularly to a method and apparatus for performing passive countermeasures as to prevent an injury to an operator during a collision.

Collision warning and countermeasure systems are becoming more widely used. Collision warning systems provide a vehicle operator knowledge and awareness of objects or vehicles within a close proximity so as to prevent colliding with those objects. Countermeasure systems exist in various passive and active forms. Some countermeasure systems are used to aid in prevention of a collision others are used to aid in the prevention of injury to a vehicle operator.

Collision warning systems and countermeasure systems currently exist in various forms. Certain collision warning systems and countermeasure systems are able to sense a vehicle or object in the close proximity to a host vehicle and warn the host vehicle operator, such that the operator can take precautionary steps to prevent a collision or injury. Other collision warning systems and countermeasure systems activate passive or active countermeasures such as air bags, load limiting seat belts, or brake control whereby the system itself aids in preventing a collision or injury.

Currently collision warning systems and countermeasure systems are used independently and do not interact with each other in a cooperative fashion as to, in a combined fashion, further decrease the probability of a collision or injury. The current collision warning systems also do not utilize a majority of existing vehicle sensors such as tire pressure sensors and occupant classification sensors, in conjunction with the collision warning systems and countermeasure systems again to further decrease the probability of a collision or injury.

Separate from collision warning systems and countermeasure systems other systems exist for autonomously controlling a vehicle. These systems may include devices such as cameras, sensors, steering control, brake control, and accelerator control. Autonomous type systems have primarily been used for military applications and not for collision and injury prevention in automotive vehicles.

Current collision warning systems and countermeasure systems also perform passive countermeasures in response to accelerometer data. The accelerometer data is primarily received from accelerometers located near the outer surface of the vehicle. For example, an accelerometer located on a vehicle bumper or in a close proximity to that location is typically used to signal an airbag to deploy during a collision. Use of these externally located accelerometers to deploy passive countermeasures is limiting in the prevention of injury during a collision in that they are limited in information of vehicle status and operator status. In other words, the externally placed accelerometers do not supply information such as seat positioning, occupant positioning, or other related information that may be used to better prevent injury.

An ongoing concern for safety engineers is to provide a safer automotive vehicle with increased collision warning and safety countermeasure intelligence as to decrease the probability of a collision or an injury. Therefore, it would be desirable to provide an improved collision warning and safety countermeasure system for an automotive vehicle that incorporates existing techniques and others to create a more efficient collision and injury prevention system for an automotive vehicle.

SUMMARY OF INVENTION

The foregoing and other advantages are provided by a method of performing passive countermeasures for an automotive vehicle. A method of performing passive countermeasures for an automotive vehicle having a vehicle sensor complex generating a vehicle sensor complex signal is provided. The method of performing passive countermeasures includes performing an accelerometer initiated passive countermeasure method and performing a sensor fusion initiated passive countermeasure method. An object is detected with a sensor fusion and an object parameter signal is generated. The object parameter signal is compared with an object parameter threshold level. The sensor fusion initiated passive countermeasure method is terminated when the object parameter signal is greater than the object parameter threshold level.

One of several advantages of the present invention is that it provides a method for deploying passive countermeasures in a cooperative manner as to efficiently prevent injury to a vehicle occupant.

Another advantage of the present invention is that it provides increased vehicle intelligence as in assessing a potential collision situation and determining what actions to perform, when to perform the actions, and in what manner to perform the actions.

Additionally, the present invention provides vehicle and occupant related information in combination with accelerometer data to deploy passive countermeasures in a more comprehension manner.

Furthermore, the present invention provides a method for determining whether to deploy passive countermeasures at an earlier time in a potential collision event using pre-collision vehicle, occupant, and object related information. The ability to assess pre-collision information allows the present invention to provide an increased safety performance method for deploying passive countermeasures over traditional accelerometer based collision warning systems and countermeasure systems.

The present invention itself, together with attendant advantages, will be best understood by reference to the following detailed description, taken in conjunction with the accompanying figures.

BRIEF DESCRIPTION OF DRAWINGS

For a more complete understanding of this invention reference should now be had to the embodiments illustrated in greater detail in the accompanying figures and described below by way of examples of the invention.

DETAILED DESCRIPTION

While the present invention is described with respect to a method and apparatus for warning a vehicle operator of a potential collision with an object and providing countermeasures as to prevent the collision and injury to the operator, the present invention may be adapted to be used in various systems including: forward collision warning systems, collision avoidance systems, vehicle systems, or other systems that may require collision avoidance or assessment.

In the following description, various operating parameters and components are described for one constructed embodiment. These specific parameters and components are included as examples and are not meant to be limiting.

Also, in the following description the term "performing" may include activating, deploying, initiating, powering, and other terms known in the art that may describe the manner in which a passive countermeasure may be operated.

Additionally, in the following description various countermeasures are discussed. The countermeasures may be reversible or irreversible. Reversible countermeasures refer to countermeasures that may be reset to their original form or used repeatedly without a significant amount of functional deficiency, which may be determined by a system designer. Irreversible countermeasures refer to countermeasures, such as air bags that once deployed are not reusable. Also passive countermeasures that are both reversible and irreversible may be used in replacement of reversible and irreversible countermeasures.

Figure 1:
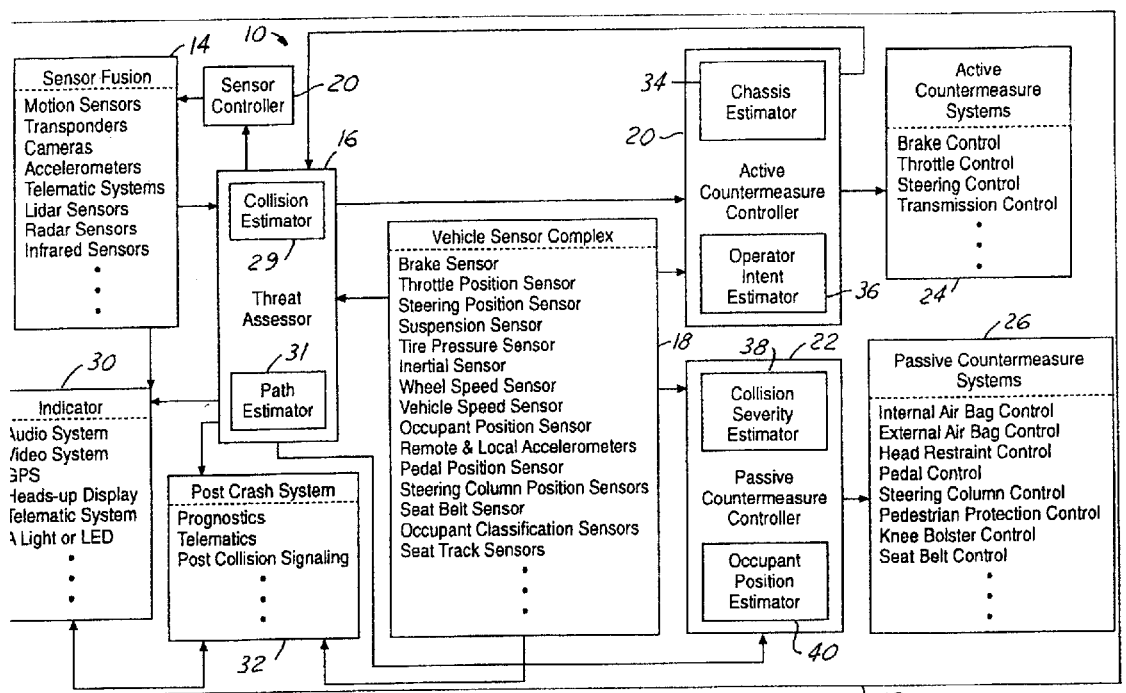
FIG. 1 is a block diagrammatic view of a collision warning and safety countermeasure system for an automotive vehicle in accordance with an embodiment of the present invention.

Referring now to FIG. 1, a block diagrammatic view of a collision warning and safety countermeasure system 10 for an automotive vehicle 12 in accordance with an embodiment of the present invention is shown. The system 10 continuously monitors the environment and current situation that the vehicle 12 is encountering through the use of a sensor fusion 14. When the sensor fusion 14 detects an object in close proximity to the vehicle 12 it generates an object status signal which is transferred to a threat assessor 16 for further evaluation. An object may be an automotive vehicle, a pedestrian, a building, a road construction device, or other object. The threat assessor 16 generates a vehicle status signal from continuous signal updates generated by a vehicle sensor complex 18. The complex 18 generates a vehicle sensor complex signal, which is monitored by several system components. The threat assessor 16 generates a collision assessment signal upon generating the vehicle status signal and receiving the object status signal. An active countermeasure controller 20 and a passive countermeasure controller 22 signals active countermeasure systems 24 or passive countermeasure systems 26 as to perform active or passive countermeasures when appropriate in response to the collision assessment signal and the vehicle sensor complex signal, respectively. The system 10 also includes a sensor controller 28, an indicator 30, and a post collision system 32. The sensor controller 28 signals the sensor fusion 14 in response to the collision assessment signal. The indicator 30 is used to signal and notify a vehicle operator of a potential collision and supply other related information. The post collision system 32 includes prognostics and telematics as to inform vehicle occupants and others, such as emergency services, of vehicle and occupant statuses.

The threat assessor 16, the sensor controller 28, the active countermeasure controller 20, and the passive countermeasure controller 22 are preferably microprocessor based such as a computer having a central processing unit, memory (RAM and/or ROM), and associated input and output buses. The above stated assessor and controllers may be a portion of a central vehicle main control unit, an interactive vehicle dynamics module, a restraints control module, a main safety controller, or a stand-alone rear collision controller.

The sensor fusion 14 may be as simple as a single motion sensor or a single accelerometer or may be as complex as a combination of multiple motion sensors, accelerometers, cameras, and transponders. The sensor fusion 14 may contain any of the above mentioned sensors and others such as radar, lidar, ultrasonic, active infrared, passive infrared, telematic, or other sensors known in the art. Sensor fusion 14 is used for various purposes including: object detection, path prediction, environment scanning, collision assessment, and other safety purposes. The sensor fusion 14 generates a surroundings status signal, which is further used by the threat assessor 16 in collision probability estimations. The surroundings status signal may contain a camera scene or an infrared scene of the environment surrounding the vehicle 12. The sensor fusion 14 may determine an object relative position to the vehicle 10, an object relative velocity to the vehicle 10, and other object identification parameters known in the art.

The sensor controller 28 in signaling the sensor fusion 14 may be performing several actions including: adjusting the orientation of a sensor, adjusting the sensitivity or amplitude of a sensor, transmitting a signal via a transponder to a receiver located on an impending object, adjusting sensor outputs, or for performing other related actions. By transmitting signals to impending objects, the impending objects or operators of the impending objects may also perform collision avoidance and countermeasure actions.

Complex 18 is a conglomerate of various vehicle system sensors including: a brake sensor, a throttle sensor, an inertial sensor, a steering sensor, a suspension sensor, a tire pressure sensor, a vehicle inertial sensor, a wheel speed sensor, a vehicle speed sensor, an occupant position sensor, a seat belt sensor, an occupant classification sensor, accelerometers, a pedal sensor, a seat track sensor, a steering column sensor, or other vehicle sensors. The inertial sensor may allow the system 10 to determine roll, pitch, and yaw of the vehicle 12 or a vehicle component in the x, y, and z directions. The accelerometers may be remote accelerometers located near the outer contact surfaces of the vehicle 12 as to measure immediate collision accelerations or local accelerometers located at various internal vehicle locations as to measure internal pre and post collision accelerations. The above sensors may be used individually, separately, or in conjunction with each other. They may also be used for multiple purposes for example in generating the vehicle status signal and in generating the vehicle sensor complex signal.

The threat assessor 16 determines the potential for a collision between the vehicle 12 and an object using a collision estimator 29. The threat assessor 16 gathers various data from multiple signals, such as the sensor fusion signal and the vehicle sensor complex signal inputs these signals into the collision estimator 29 as to assess the environment and current situation that the vehicle 12 is encountering. The threat assessor 16 in response to the environment and the current situation determines whether any actions should be performed. The actions may include signaling the active countermeasure controller 20 or the passive countermeasure controller 22 to perform a countermeasure, signaling or indicating to the operator of the vehicle 12 of an impending potential collision, or may determine not to perform any action. The threat assessor 16 also predicts the future path of the vehicle 12 and of the impending object using a path estimator 31 as to further determine the potential of a collision.

Threat assessor 16 generates various object related information from the various sensors within the sensor fusion 14 and the vehicle sensor complex 18 including: probability that a collision may occur, time until a potential collision may occur, point of collision, impending object prioritization, object identification, and other object related parameters. Point of collision refers to a spatial window where a collision may occur. All of the above information may be included in the collision assessment signal and further used within other system components as to prevent a collision or injury.

The threat assessor 16, similar to that of the sensor controller 28, may also signal the sensor fusion 14 as to adjust the orientation of a sensor within the sensor fusion 14, adjust the sensitivity or amplitude of a sensor, to transmit a signal via a transponder to a receiver located on an impending object, or for other related purposes. The threat assessor 1 6 may warn an operator of an impending vehicle as well as the operator of the impending vehicle, thereby, further increasing collision avoidance.

Active countermeasure controller 20 includes a chassis estimator 34 and an operator intent estimator 36. The chassis estimator 34 in combination with the complex 18 determines the current state of the vehicle 12. The current state of the vehicle 12 may include the vehicle traveling velocity, whether the vehicle is braking, whether the vehicle is turning, the current state of the suspension, and other vehicle conditions that are monitored by sensors. The operator intent estimator 36 determines the intent of the operator including direction of travel, acceleration or deceleration intent, whether the operator is intending to override any vehicle automated controls, and other related operator intents and generates an operator intent estimator signal. The active countermeasure controller 20 generates an active countermeasure signal in response to the chassis estimator signal and the operator intent estimator signal.

Active countermeasure systems 24 include brake control, throttle control, steering control, suspension control, transmission control, and other chassis control systems. The active countermeasure controller 20 in response to the chassis estimator signal and the operator intent estimator signal signals one or more of the active countermeasure systems 24, as needed, so as to prevent a collision or injury. The active countermeasure controller 20 may autonomously operate the vehicle 12 using the active countermeasure systems 24.

Passive countermeasure controller 22 contains a collision severity estimator 38 and an occupant positions estimator 40. The collision severity estimator 38 generates a collision severity signal in response to the collision assessment signal and the vehicle sensor complex signal. The occupant position estimator 40 generates an occupant position estimator signal in response to the vehicle sensor complex signal. The passive countermeasure controller 22 generates a passive countermeasure signal in response to the collision severity signal and the occupant position estimator signal.

Passive countermeasure systems 26 are signaled via the passive countermeasure controller 22 by the passive countermeasure signal. The passive countermeasure systems 26 include internal air bag control, seatbelt control, knee bolster control, head restraint control, load limiting pedal control, load limiting steering control, pretensioner control, external air bag control, and pedestrian protection control. Pretensioner control may include control over pyrotechnics and seat belt pretensioners. Air bag control may include control over front, side, curtain, hood, dash, or other type air bags. Pedestrian protection control may include controlling a deployable vehicle hood, a bumper system, or other pedestrian protective devices.

Indicator 30 generates a collision-warning signal in response to the surrounding status signal and the collision assessment signal, which is indicated to the vehicle operator. The indicator 30 may include a video system, an audio system, an LED, a light, global positioning system, a heads-up display, a headlight, a taillight, a display system, a telematic system or other indicator. The indicator 30 may supply warning signals, collision-related information, external-warning signals to objects or pedestrians located outside of the vehicle, or other pre and post collision information.

Post collision system 32 may include telematics and generate post collision signals as well as provide prognostics of vehicle and occupant statuses. Emergency centers may be signaled such as hospitals, police stations, fire stations, or other emergency centers. The prognostics may offer occupant status including occupant heart rate, occupant breathing information, occupant positioning, or other occupant information. The telematics using modern verbal communication systems allows a vehicle occupant to communicate to one of the above-mentioned emergency centers. Vehicle status information may also be communicated using the telematics.

Although, the system signals, such as the collision assessment signal and the vehicle sensor complex signal are represented by single arrows 50 and referred to as single signals these system signals may contain multiple signals from various vehicle sensors and systems.

Figure 2:
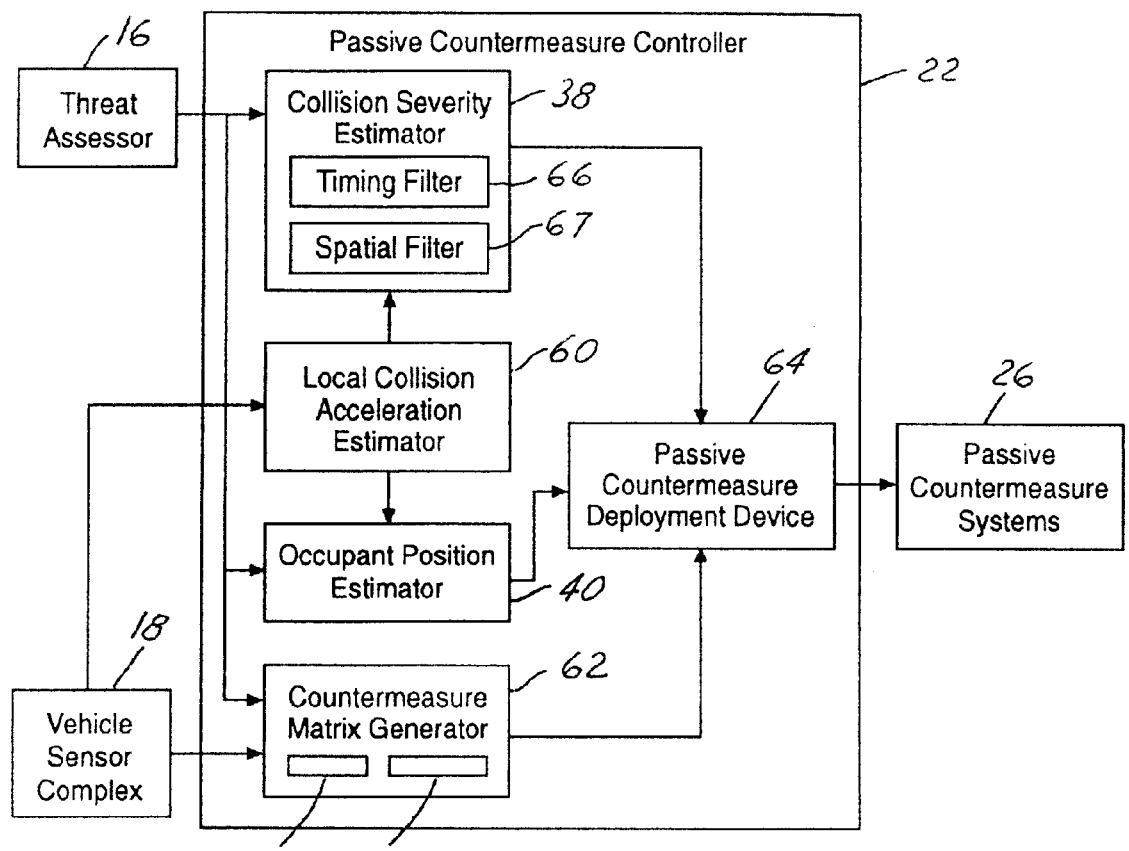
FIG. 2 is a block diagrammatic view of a passive countermeasure controller internal architecture in accordance with embodiment of the present invention.

Referring now to FIG. 2, a block diagrammatic view of the passive countermeasure controller 22 internal architecture in accordance with embodiment of the present invention is shown. Passive countermeasure controller 22 contains, as stated above, the collision severity estimator 38 and the occupant position estimator 40. The passive countermeasure controller 22 may also include a local collision acceleration estimator 60, a countermeasure matrix generator 62, and a passive countermeasure deployment device 64.

The collision severity estimator 38 contains a timing filter 66 and a spatial filter 67. The timing filter 66 and the spatial filter 67 are used to filter false sensor data. The collision severity estimator 38 monitors object time to collision and object point of collision among other factors to determine whether received data is false data or not, so as to prevent false deployment of a passive countermeasure system 26. The collision severity estimator 38 generates a range of time having a predetermined minimum time and a predetermined maximum time in response to the object time to impact. Collision severity estimator 38 uses accelerometer data to confirm whether a collision has occurred. When a collision has not been confirmed within the range of time the timing filter 66 determines that the prediction of a collision is false. Collision severity estimator 38 upon detecting that the prediction of a collision is false does not activate a passive countermeasure 26. In a similar fashion, the collision severity estimator 38 determines whether a collision has occurred at the object point of collision using the spatial filter 67 and confirming the collision with accelerometers. For example, when an accelerometer located on the vehicle 12 does not detect a collision at a location on the vehicle 12 corresponding to the object point of impact the collision severity estimator 38 does not activate a passive countermeasure 26. In confirming a collision a decreased amount of accelerometer data is acquired than when using only accelerometer data to determine when a collision has occurred. The timing filter 66 and the spatial filter 67 allow the passive countermeasure controller 22 to determine whether to activate a passive countermeasure 26 earlier in time as compared to using only accelerometer data.

The collision severity estimator 38 contains a minimum performance standard as to deploy a passive countermeasure system 26 in response to accelerator data. The minimum performance standards contain threshold levels pertaining to sensor signals, which are overcome before deploying a passive countermeasure system 26. Collision severity estimator 38, in response to other vehicle sensors in the sensor fusion 14 and the complex 18 is capable of determining whether a passive countermeasure system 26 should be deployed earlier in time, later in time, or using a standard deployment time. The vehicle sensors are integrally used to determine collision severity and allow for quicker deployment reaction time when necessary. The collision severity estimator 38 may also adjust the rate of deployment of the passive countermeasure systems 26.

The local collision acceleration estimator 60 generates an accelerometer based collision severity signal. The accelerometer based collision severity signal is used by the collision severity estimator 38 in determining whether the appropriate sensor signal levels are greater than the threshold levels, in which case the local collision acceleration estimator 60 determines that a passive countermeasure system 26 should be deployed in response to the accelerometer data.

The occupant position estimator 40 monitors remote and local accelerometers, seat belt sensors, occupant position sensors, seat track sensors, occupant classification, and other parameters determined by the threat assessor 16 as to best determine occupant classification, accelerations, and occupant position before, during, and after a collision. Occupant related information enables the passive countermeasure controller 22 to deploy passive countermeasure systems 26 as to best prevent injury to an occupant.

The countermeasure matrix generator 62 generates and contains a maximum subset countermeasure matrix 70 and an available countermeasure matrix 72. The maximum countermeasure matrix 70 contains maximum subsets when threshold levels are exceeded within one maximum subset a passive countermeasure system 26 may be deployed. The available countermeasure matrix 72 contains all available passive countermeasure systems that the system 10 may implement. Incorporating a maximum subset countermeasure matrix 70 allows for quicker deployment decisions by reducing the number of potential countermeasures that may be used from the available countermeasure matrix 72.

The passive countermeasure deployment device 64 in response to the collision severity estimator 38, the occupant position estimator 40, and the countermeasure matrix generator 62 generates the passive counter measure signal, which includes passive countermeasure systems deployment information.

Figure 3:
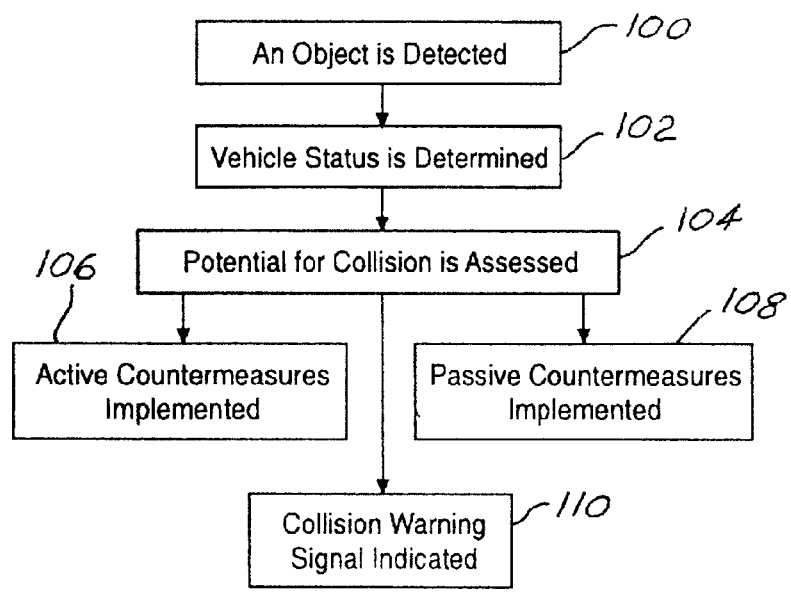
FIG. 3 is a flow chart illustrating a method of collision warning and activating safety countermeasures for an automotive vehicle in accordance with an embodiment of the present invention.

Referring now to FIG. 3, a flow chart illustrating a method of collision warning and activating safety countermeasures for the automotive vehicle 12 in accordance to an embodiment of the present invention is shown. The automotive vehicle 12 has, as stated above, the complex 18 that generates the vehicle sensor complex signal.

In step 100, an object is detected by the sensor fusion 14 and an object status signal is generated as described above.

In step 102, the vehicle status is determined in response to the vehicle sensor complex signal and the vehicle status signal is generated.

In step 104, potential for collision with the object is assessed in response to the object status signal and the vehicle status signal. A vehicle predicted future path signal and an object predicted future path signal may also be generated in response to the object status signal and the vehicle status signal. In so doing, the future path of the vehicle 12 may be compared to the future path of the object. A collision assessment signal is generated in response to the object status signal, the vehicle status signal, the vehicle predicted future path signal, and the object predicted future path signal.

In step 106, active countermeasures may be implemented in response to the collision assessment signal and the vehicle sensor complex signal as needed. The active countermeasure controller 20 transfers the active countermeasure signal to the active countermeasure systems 24 accordingly. In generating an active countermeasure signal the chassis estimator signal and the operator intent estimator signal may also be used when implementing the active countermeasures as described above.

In step 108, passive countermeasures may be implemented in response to the collision assessment signal and the vehicle sensor complex signal as needed. The passive countermeasure controller 22 transfers the passive countermeasure signal to the passive countermeasure systems 26 accordingly. The collision severity signal and the occupant position estimator signal also as described above may be used when implementing the passive countermeasures.

In step 110, a collision-warning signal is indicated to the operator in response to the collision assessment signal as described above.

Figure 4A:
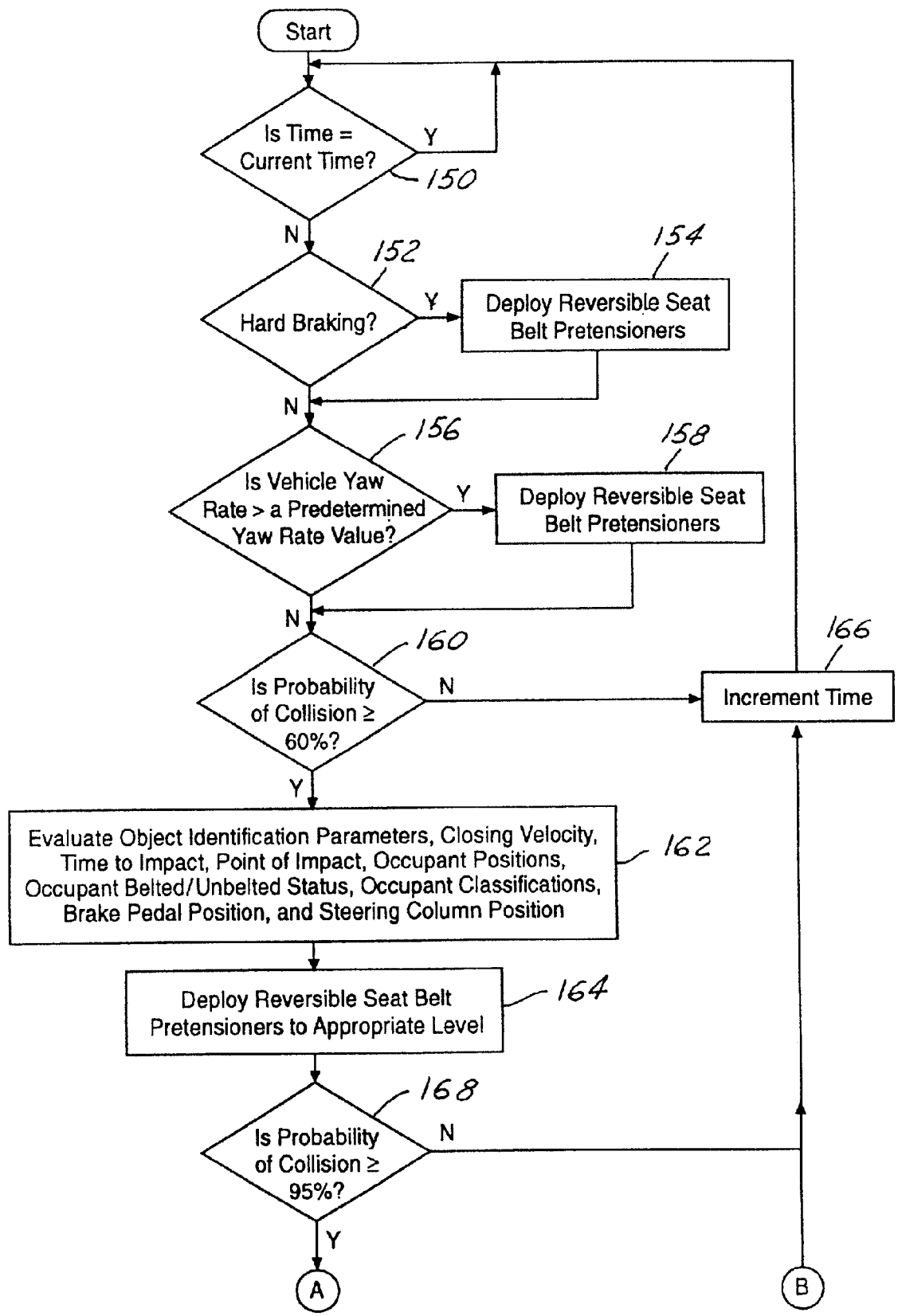
FIG. 4A is a flow chart illustrating a sensor fusion initiated passive countermeasure method in accordance with an embodiment of the present invention.
Figure 4B:
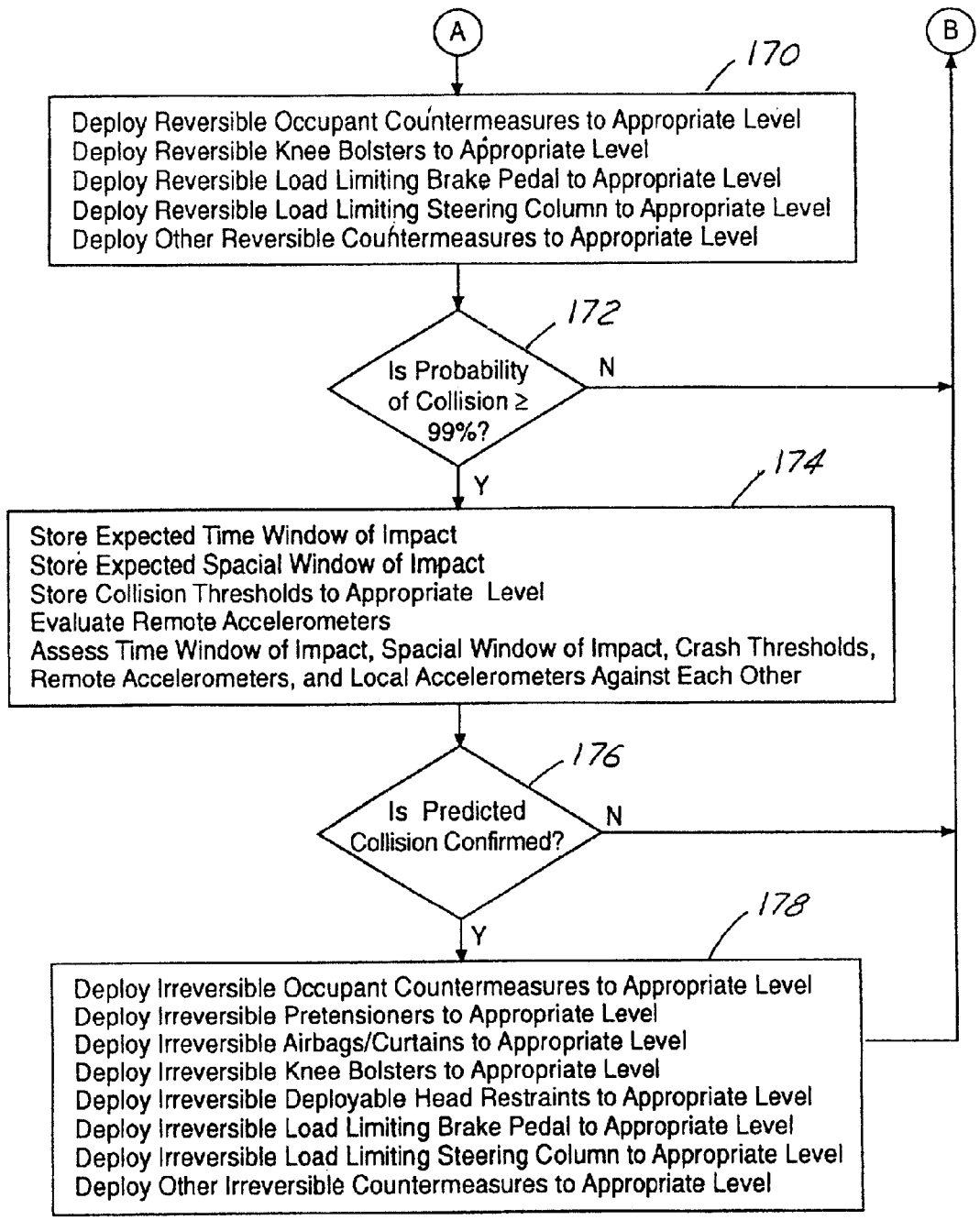
FIG. 4B is a continuation of the flow chart illustrated in FIG. 4A.
Figure 5:
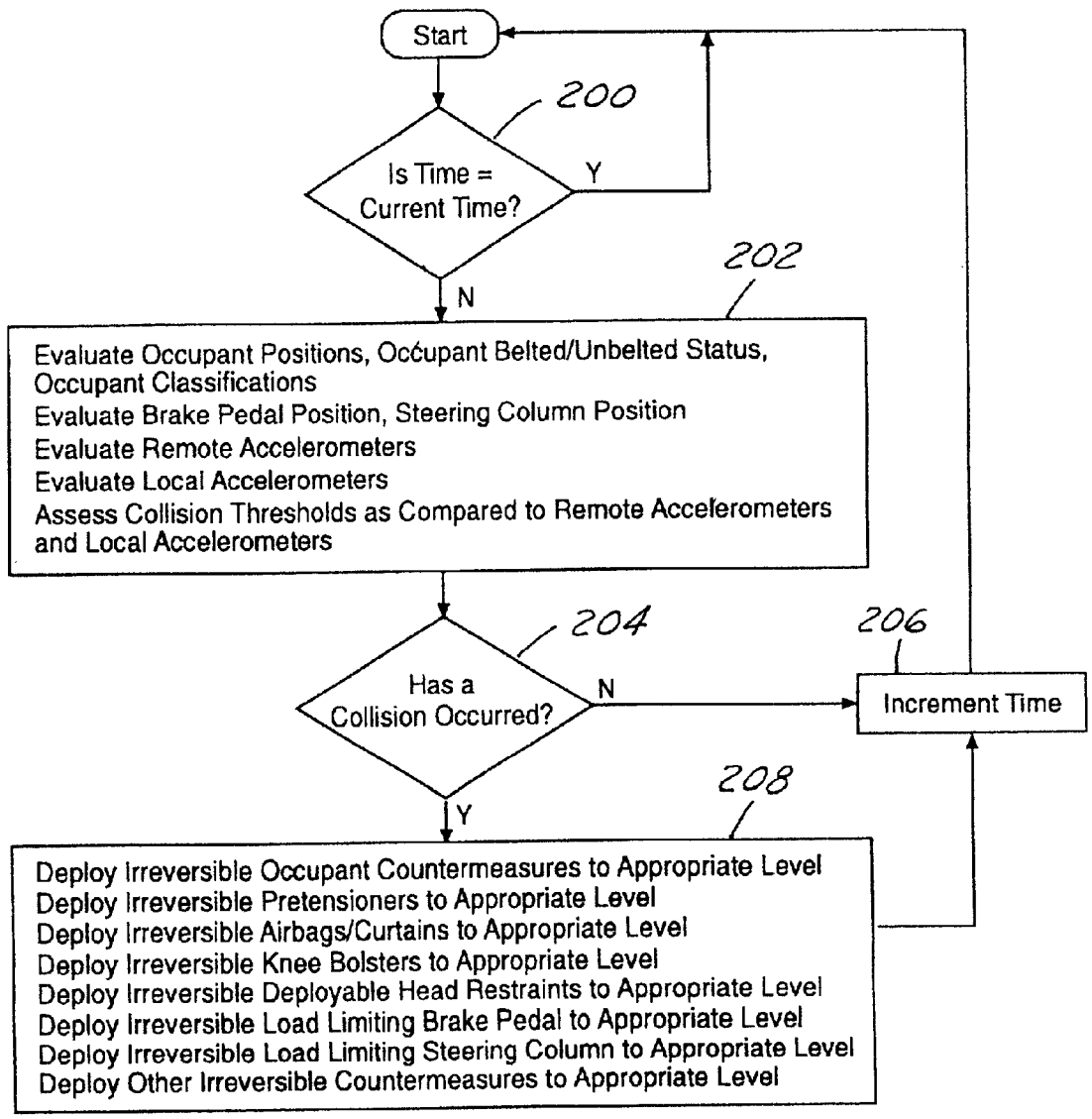
FIG. 5 is a flow chart illustrating an accelerometer initiated passive countermeasure method in accordance with an embodiment of the present invention.

The following methods that are described in FIGS. 4A, 4B, and 5 are preferably performed simultaneously. Of course, in less sophisticated systems the following methods may be performed separately and not in combination with each other. In performing the methods simultaneously the vehicle 12 not only has a minimum performance criteria but also has an additional performance criteria using information generated from the sensor fusion 14 in addition to information generated from the vehicle sensor complex 18. When the sensor fusion 14 does not detect an object appropriately, because of the simultaneous use of the following methods the passive countermeasure controller 22 may continue to deploy or activate passive countermeasures using accelerometer information alone. The ability to use only accelerometer data to activate passive countermeasures allows the passive countermeasure controller 22 to maintain a minimum level of injury prevention, which is equal to or better than the level of injury prevention of traditional countermeasure systems.

Also, the sensor fusion 14, the sensor controller 28, the threat assessor 16, or the passive countermeasure controller 22 may determine whether an object has been detected appropriately and generate a sensor fusion error signal when an object is not detected appropriately. In determining whether an object has been detected appropriately at least one object parameter is compared with corresponding object parameter thresholds. When an object parameter threshold or group of object parameter thresholds have been exceeded the object has not been detected appropriately, in which case the sensor fusion error signal is generated. The system 10 may then perform the accelerometer initiated passive countermeasure method in response to the sensor fusion error signal instead of performing the sensor fusion initiated passive countermeasure method.

Referring now to FIGS. 4A and 4B, a flow chart illustrating a sensor fusion initiated passive countermeasure method in accordance with an embodiment of the present invention is shown.

In step 150, a time value is monitored as to determine whether a passive countermeasure has been performed. Also the time value allows the passive countermeasure controller 22 to determine a duration of time, therein, when a first passive countermeasure has been performed in addition to a current time value. Incremental times may be recorded for each passive countermeasure, as they are activated, for further evaluation and assessment purposes. When the time value is not equal to the current time value, step 152 is performed. Otherwise, step 150 is repeated.

In step 152, the passive countermeasure controller 22 determines whether vehicle brake pressure is greater than a predetermined brake pressure value and generates a brake pressure signal. The brake pressure value may be contained within the vehicle sensor complex signal. When the vehicle brake pressure is greater than a predetermined value step 154 is performed.

In step 154, the passive countermeasure controller activates reversible seat belt pretensioners as to pull occupants into a seat, so as to provide greater distance between occupants and air bags. The seat belt pretensioners are activated at appropriate levels depending on vehicle velocities, accelerations, occupant positioning, probability of collision, and other related parameters.

In step 156, the passive countermeasure controller 22 determines whether vehicle yaw rate is greater than a predetermined yaw value and generates a yaw rate signal. When the yaw rate signal is greater than a predetermined yaw rate step 158 is performed.

In step 158, as in step 154, the passive countermeasure controller activates reversible seat belt pretensioner.

In step 160, the passive countermeasure controller 22 determines whether the probability of a collision is determined to be greater than or equal to a first predetermined collision probability value. When the probability of a collision is greater than or equal to a first predetermined collision probability value steps 162 and 164 are performed incrementally or simultaneously, otherwise step 166 is performed.

In step 162, the following is an example of object, vehicle, and occupant parameters that are evaluated: object identification parameters, closing velocity, time to collision, point of collision, occupant positions, occupant belted/unbelted status, occupant classifications, brake pedal position, and steering column position. Other parameters may also be evaluated. From the evaluated parameters the passive countermeasure controller 22 is able to further assess the probability of a collision and the status of the vehicle 12 and the occupants.

In step 164, as in steps 154 and 158 reversible seat belt pretensioners are enabled at appropriate levels.

In step 166, the time value is incremented and the passive countermeasure controller 22 returns to step 150.

In step 168, upon finishing steps 162 and 164 the probability of a collision is compared to a second predetermined collision probability value, which is greater than that of the first predetermined collision probability value. When the probability of a collision is greater than or equal to a second predetermined collision probability value step 170 is performed.

In step 170, reversible passive countermeasures of passive countermeasures 26 may be deployed or activated, at appropriate levels, including occupant countermeasures, knee bolsters, a load limiting brake pedal, and a load limiting steering column. Other passive countermeasures 26 may also be deployed. Note passive countermeasures 26 that are compatible with each other are the countermeasures that are activated.

In step 172, the probability of a collision is further compared with a third predetermined collision probability value, which is greater than the second predetermined collision probability value. When the probability of a collision is greater than or equal to the third predetermined collision probability value step 174 is performed, otherwise the passive countermeasure controller returns to step 166.

In step 174, several values are recorded, signals from accelerometers are evaluated, and collision information is assessed. The expected time window of collision, the expected spatial window of collision, and collision thresholds are stored at appropriate levels. Collision thresholds are adjusted in response to occupant, vehicle, and object-related information. Signals generated by remote and local accelerometers are evaluated as to determine whether a collision has occurred. The passive countermeasure controller 22 also assesses the time window of collision, the spatial window of collision, the collision thresholds, the remote accelerometers, and the local accelerometers. Depending upon the evaluation and assessment results the passive countermeasure controller 22 may activate irreversible passive countermeasures, of the passive countermeasures 26, that are of course compatible with each other. The passive countermeasure controller 22 continues to step 176.

In step 176, the passive countermeasure controller 22 determines whether a collision is confirmed. When a collision is confirmed the passive countermeasure controller 22 continues to step 178, otherwise it reverts to step 166.

In step 178, the passive countermeasure controller 22 activates or deploys irreversible passive countermeasures such as the occupant countermeasures, pretensioners, air bags, air bag curtains, knee bolsters, deployable head restraints, load limiting brake pedal, load limiting steering column, and other irreversible countermeasures at appropriate levels. Upon finishing step 178 the passive countermeasure controller 22 reverts to step 166.

Referring now to FIG. 5, a flow chart illustrating an accelerometer initiated passive countermeasure method in accordance with an embodiment of the present invention is shown.

In step 200, as in step 150 of the method of FIG. 4A a time value is monitored. When the time value is not equal to a current time value step 202 is performed, otherwise step 200 is repeated.

In step 202, the passive countermeasure controller 22 evaluates occupant and vehicle related information. Occupant positions, occupant seat belt status, occupant classifications, brake pedal position, steering column position, remote and local accelerometers are evaluated. The passive countermeasure controller 22 also assesses collision thresholds versus remote and local accelerometer data as to determine whether a collision has occurred. The passive countermeasure controller 22 continues to step 204.

In step 204, the passive countermeasure controller 22 determines whether a collision has occurred. When a collision has occurred step 208 is performed otherwise step 206 is performed.

In step 206, the passive countermeasure controller 22 increments the time value as in step 166 of FIG. 4A.

In step 208, the passive countermeasure controller 22 deploys or activates irreversible passive countermeasures as in step 178 of FIG. 4A.

The sensor fusion initiated passive countermeasure method allows the passive countermeasure controller 22 to deploy passive countermeasures 26 earlier in a collision event. By deploying the passive countermeasures 26 earlier in time the passive countermeasures 26 may be deployed at a reduced rate thereby potentially decreasing the probability of injury to a vehicle occupant due to the passive countermeasure deploying at a higher rate. The sensor fusion initiated passive countermeasure method also allows the passive countermeasure controller 22 to perform differently depending on probability of a collision occurring, which allows passive countermeasures 26 to be performed at different collision probability levels. The increased ability to sense a potential collision and assess vehicle, occupant, and object related information in a comprehensive and cooperative manner decreases the probability of an injury occurring.

The present invention provides a method for deploying passive countermeasures in a cooperative manner as to efficiently prevent injury to a vehicle occupant. The cooperative manner includes determining whether to deploy passive countermeasures at an earlier time in a potential collision event using pre-collision vehicle, occupant, and object related information as to better assess what passive counter measures are appropriate to deploy and to what extent.

The above-described apparatus, to one skilled in the art, is capable of being adapted for various purposes and is not limited to the following systems: forward collision warning systems, collision avoidance systems, vehicle systems, or other systems that may require collision avoidance or assessment. The above-described invention may also be varied without deviating from the spirit and scope of the invention as contemplated by the following claims.

What is claimed is:

1. A method of operating passive countermeasures for an automotive vehicle having a vehicle sensor complex generating a vehicle sensor complex signal, said method comprising:

performing an accelerometer initiated passive countermeasure method;

performing a sensor fusion initiated passive countermeasure method;

detecting an object with a sensor fusion and generating an object parameter signal;

comparing said object parameter signal with an object parameter threshold level; and terminating said sensor fusion initiated passive countermeasure method when said object parameter signal is greater than said object parameter threshold level.

2. A method as in claim 1 wherein performing an accelerometer initiated passive countermeasure method comprises:

evaluating the vehicle sensor complex signal and generating an occupant evaluation signal and a vehicle evaluation signal in response to the vehicle sensor complex signal;

assessing predetermined collision thresholds relative to accelerometer data contained within the vehicle sensor complex signal and generating an accelerometer assessment signal;

determining whether a collision has occurred and generating a collision signal; and signaling passive countermeasures systems to deploy passive countermeasures in response to said occupant evaluation signal, vehicle evaluation signal, said accelerometer assessment signal, and said collision signal.

3. A method as in claim 2 wherein evaluating the vehicle sensor complex signal comprises evaluating at least one of occupant position data, occupant belted data, occupant classification data, occupant acceleration data, and seat positioning data.

4. A method as in claim 2 wherein evaluating the vehicle sensor complex signal comprises evaluating at least one of a brake signal, a throttle signal, a steering signal, a suspension signal, a tire pressure signal, a vehicle inertial signal, a wheel speed signal, a vehicle speed signal, an occupant position signal, a collision signal, a seat belt signal, an occupant classification signal, a pedal signal, and a steering column signal.

5. A method as in claim 2 wherein assessing predetermined collision thresholds relative to accelerometer data comprises comparing predetermined collision thresholds to remote collision accelerometers or local accelerometers.

6. A method as in claim 2 wherein signaling passive countermeasures systems to deploy passive countermeasures comprises deploying at least one of a occupant countermeasure, pyrotechnic pretensioner, an airbag, an airbag curtain, a knee bolster, a deployable head restraint, a load limiting brake pedal, a load limiting steering column.

7. A system as in claim 6 wherein signaling passive countermeasures systems to deploy passive countermeasures comprises deploying reversible or irreversible passive countermeasures.

8. A system as in claim 6 wherein deploying passive countermeasures comprises deploying passive countermeasures at appropriate determined levels in response to said occupant evaluation signal, vehicle evaluation signal, and said accelerometer assessment signal.

9. A method as in claim 1 further comprising monitoring an amount of iterations said method has been performed.

10. A method as in claim 1 wherein performing a sensor fusion initiated passive countermeasure method comprises:

determining whether vehicle brake pressure is greater than a predetermined brake pressure value and generating a brake pressure signal; and deploying passive countermeasures in response to said brake pressure signal.

11. A method as in claim 1 wherein performing a sensor fusion initiated passive countermeasure method comprises:

determining whether vehicle yaw rate is greater than a predetermined yaw value and generating a yaw rate signal; and deploying passive countermeasures in response to said yaw rate signal.

12. A method as in claim 1 wherein performing a sensor fusion initiated passive countermeasure method comprises:

sensing an object via the sensor fusion;

determining probability of a collision between the vehicle and said object;

evaluating object related information and generating an object evaluation signal;

evaluating the vehicle sensor complex signal and generating an occupant evaluation signal and a vehicle evaluation signal in response to the vehicle sensor complex signal;

signaling passive countermeasures systems to deploy passive countermeasures in response to said object evaluation signal, said occupant evaluation signal, and said vehicle evaluation signal.

13. A system as in claim 12 signaling passive countermeasures systems to deploy passive countermeasures comprises deploying reversible or irreversible passive countermeasures.

14. A method as in claim 12 further comprising:

assessing collision thresholds relative to accelerometer data contained within the vehicle sensor complex signal and generating an accelerometer assessment signal; and signaling passive countermeasures systems to deploy passive countermeasures in response to said accelerometer assessment signal.

15. A method as in claim 12 further comprising:

determining whether a collision has occurred and generating a collision signal; and signaling passive countermeasures systems to deploy passive countermeasures in response to said collision signal.

16. A method as in claim 12 wherein evaluating object related information, evaluating occupant related information, evaluating vehicle related information, signaling passive countermeasures systems is performed when said probability of a collision is greater than or equal to a predetermined collision probability value.

17. A method as in claim 12 further comprising:

determining said probability of a collision is greater than or equal to a first predetermined collision probability value; and deploying a reversible passive countermeasure.

18. A method as in claim 17 further comprising:

determining said probability of a collision is greater than or equal to a second predetermined collision probability value; and deploying an additional reversible passive countermeasure.

19. A method as in claim 18 further comprising:

determining said probability of a collision is greater than or equal to a third predetermined collision probability value; and deploying an irreversible passive countermeasure.

20. A method as in claim 19 further comprising:

determining said probability of a collision is equal to a fourth predetermined collision probability value; and deploying an additional irreversible passive countermeasure.

21. A method of performing passive countermeasures for an automotive vehicle having a vehicle sensor complex generating a vehicle sensor complex signal, said method comprising:

evaluating the vehicle sensor complex signal and generating an occupant evaluation signal and a vehicle evaluation signal in response to the vehicle sensor complex signal;

assessing collision thresholds relative to accelerometer data contained within the vehicle sensor complex signal and generating an accelerometer assessment signal;

determining whether a collision has occurred and generating a collision signal; and signaling passive countermeasures systems to deploy passive countermeasures in response to said occupant evaluation signal, vehicle evaluation signal, said accelerometer assessment signal, and said collision signal.

22. A method of performing passive countermeasures for an automotive vehicle having a vehicle sensor complex generating a vehicle sensor complex signal, said method comprising:

determining whether vehicle brake pressure is greater than a predetermined brake pressure value and generating a brake pressure signal;

determining whether vehicle yaw rate is greater than a predetermined yaw value and generating yaw rate signal;

sensing an object via the sensor fusion;

determining probability of a collision between the vehicle and said object;

evaluating object related information and generating an object evaluation signal;

evaluating the vehicle sensor complex signal and generating an occupant evaluation signal and a vehicle evaluation signal in response to the vehicle sensor complex signal;

assessing collision thresholds relative to accelerometer data contained within the vehicle sensor complex signal and generating an accelerometer assessment signal;

determining whether a collision has occurred and generating a collision signal; and signaling passive countermeasures systems to deploy passive countermeasures in response to brake pressure signal, yaw rate signal, said object evaluation signal, said occupant evaluation signal, and said vehicle evaluation signal, said accelerometer assessment signal, and said collision signal.

* * * * *